United States Patent
Klingbeil

(10) Patent No.: US 10,502,119 B2
(45) Date of Patent: Dec. 10, 2019

(54) AFTER TREATMENT BYPASS FOR INTERNAL COMBUSTION ENGINE DURING COLD START AND IDLE OPERATION

(71) Applicant: GENERAL ELECTRIC COMPANY, Schenectady, NY (US)

(72) Inventor: Adam Edgar Klingbeil, Ballston Lake, NY (US)

(73) Assignee: GE Global Sourcing LLC, Norwalk, CT (US)

( * ) Notice: Subject to any disclaimer, the term of this patent is extended or adjusted under 35 U.S.C. 154(b) by 130 days.

(21) Appl. No.: 15/367,569

(22) Filed: Dec. 2, 2016

(65) Prior Publication Data

US 2018/0156100 A1   Jun. 7, 2018

(51) Int. Cl.

| | |
|---|---|
| *F01N 9/00* | (2006.01) |
| *F02D 41/08* | (2006.01) |
| *F02D 41/06* | (2006.01) |
| *F01N 3/20* | (2006.01) |
| *F01N 3/021* | (2006.01) |

(52) U.S. Cl.
CPC .............. *F01N 9/00* (2013.01); *F01N 3/021* (2013.01); *F01N 3/2066* (2013.01); *F01N 2410/03* (2013.01); *F01N 2900/1602* (2013.01); *F02D 41/064* (2013.01); *F02D 41/08* (2013.01); *Y02T 10/47* (2013.01)

(58) Field of Classification Search
CPC combination set(s) only.
See application file for complete search history.

(56) References Cited

U.S. PATENT DOCUMENTS 5,388,406 A * 2/1995 Takeshima ......... B01D 53/0454
60/297
6,779,339 B1 * 8/2004 Laroo .................. F01N 3/0253
60/274

(Continued)

FOREIGN PATENT DOCUMENTS

WO    2012123636 A1    9/2012

OTHER PUBLICATIONS

Papadakis et al., "Development of a dosing strategy for a heavy-duty diesel exhaust cleaning system based on NOX storage and reduction technology by Design of Experiments", Applied Catalysis B: Environmental, vol. 70, Issues 1-4, pp. 215-225, Jan. 31, 2007.

(Continued)

*Primary Examiner* — Binh Q Tran
(74) *Attorney, Agent, or Firm* — McCoy Russell LLP

(57) ABSTRACT

Methods of operating an internal combustion engine that has two exhaust paths, the first path having an aftertreatment system. One method includes: operating the engine at idle; directing the exhaust flow through the first exhaust path; detecting an exhaust temperature below a predetermined temperature and/or operation of the engine at idle; and diverting all, or some, of the exhaust flow through the second exhaust path, based on the detecting. Another method includes detecting an engine condition that is indicative of an oil accumulation above a threshold and diverting the exhaust flow through the second exhaust path, based on detecting this engine condition. An exhaust subsystem that includes a controller that employs these methods is disclosed.

9 Claims, 4 Drawing Sheets

(56) References Cited

U.S. PATENT DOCUMENTS

| | | |
|---|---|---|
| 7,051,521 B2 | 5/2006 | Funabashi |
| 7,066,973 B1 | 6/2006 | Bentley et al. |
| 8,161,732 B2 | 4/2012 | Peters et al. |
| 8,491,845 B2 | 7/2013 | Ettireddy et al. |
| 9,238,468 B2 | 1/2016 | Heverley, III et al. |
| 9,255,551 B2 | 2/2016 | Choi et al. |
| 9,540,985 B2 * | 1/2017 | Harmsen ............... F01N 3/0821 |
| 9,987,626 B2 * | 6/2018 | Guo ..................... B01J 35/0006 |
| 2005/0223699 A1 * | 10/2005 | Ancimer ............... F01N 3/0871 60/286 |
| 2009/0205323 A1 * | 8/2009 | Tsujimoto .......... B01D 53/9431 60/286 |

OTHER PUBLICATIONS

Buchholz et al., "IMO Tier 3: Strategies and challenges", Ship & Offshore, No. 4, pp. 76-79, 2010.

* cited by examiner

AFTER TREATMENT BYPASS FOR INTERNAL COMBUSTION ENGINE DURING COLD START AND IDLE OPERATION

BACKGROUND OF THE INVENTION

The present invention relates generally to internal combustion engines and more particularly to an aftertreatment bypass for an internal combustion engine for use during cold start, idle operation, and the like and methods of operating the engine with the aftertreatment bypass.

During idle operation, internal combustion engines, be it diesel, dual fuel, or some other type of fueling configuration, typically accumulate oil in the exhaust system that is expelled during the idle operation or shortly thereafter. With the advent of various emission regulations, these internal combustion engines are more often found with some type of an aftertreatment system. Any of the aforementioned dispelled oil that reaches these aftertreatment systems can poison the catalyst therein, thereby leading to degradation in performance and/or life of the aftertreatment system.

Accordingly, there is an ongoing need for improving internal combustion engine operation during cold start, idle, and other unique operating points.

BRIEF DESCRIPTION

The present invention overcomes at least some of the aforementioned drawbacks by providing an aftertreatment bypass for use with an internal combustion (IC) engine during cold start, idle operation, during break-in, during end of life, or other unique operating points. More specifically, the present invention includes aftertreatment bypass and method of operating an engine that resolves the problem of catalyst poisoning due to excessive oil reaching the aftertreatment system(s) that can be applied to both diesel and dual fuel IC engines.

In accordance with an aspect of the invention, a method of operating an internal combustion engine having a first exhaust path having a first aftertreatment system and a second exhaust path, the method comprises: operating the internal combustion engine at idle, thereby generating an exhaust flow; directing the exhaust flow through the first exhaust path; detecting one of: an exhaust temperature below a predetermined temperature and operation of the internal combustion engine at idle; and diverting a portion of the exhaust flow through the second exhaust path, based on the detecting.

In accordance with another aspect of the invention, an exhaust subsystem for use with an internal combustion engine comprises: a first exhaust path having a first aftertreatment system; a second exhaust path parallel to the first exhaust path; a value separating the first exhaust path and the second exhaust path; and, a controller, in communication with said valve, configured to divert a portion of an exhaust flow from the first exhaust path to the second exhaust path.

In accordance with another aspect of the invention, a method of operating an internal combustion engine having a first exhaust path having a first aftertreatment system and a second exhaust path, the method comprises: operating the internal combustion engine, thereby generating an exhaust flow; detecting an engine condition indicative of an oil accumulation above a threshold; and diverting a portion of the exhaust flow through the second exhaust path, based on detecting the engine condition.

Various other features and advantages of the present invention will be made apparent from the following detailed description and the drawings.

BRIEF DESCRIPTION OF THE DRAWINGS

The drawings illustrate one embodiment presently contemplated for carrying out the invention.

DETAILED DESCRIPTION

Aspects of the present invention have been shown to offer advantages over previous methodologies of idling, cold starting, and preserving aftertreatment systems. In an embodiment, the method includes upon certain conditions diverting some, or all, of the exhaust flow of an engine to an exhaust path other than the primary path containing the primary aftertreatment system. In this manner, the life and performance of the aftertreatment system(s) is improved. Ultimately, the operation of the overall engine system is improved.

Figure 1:
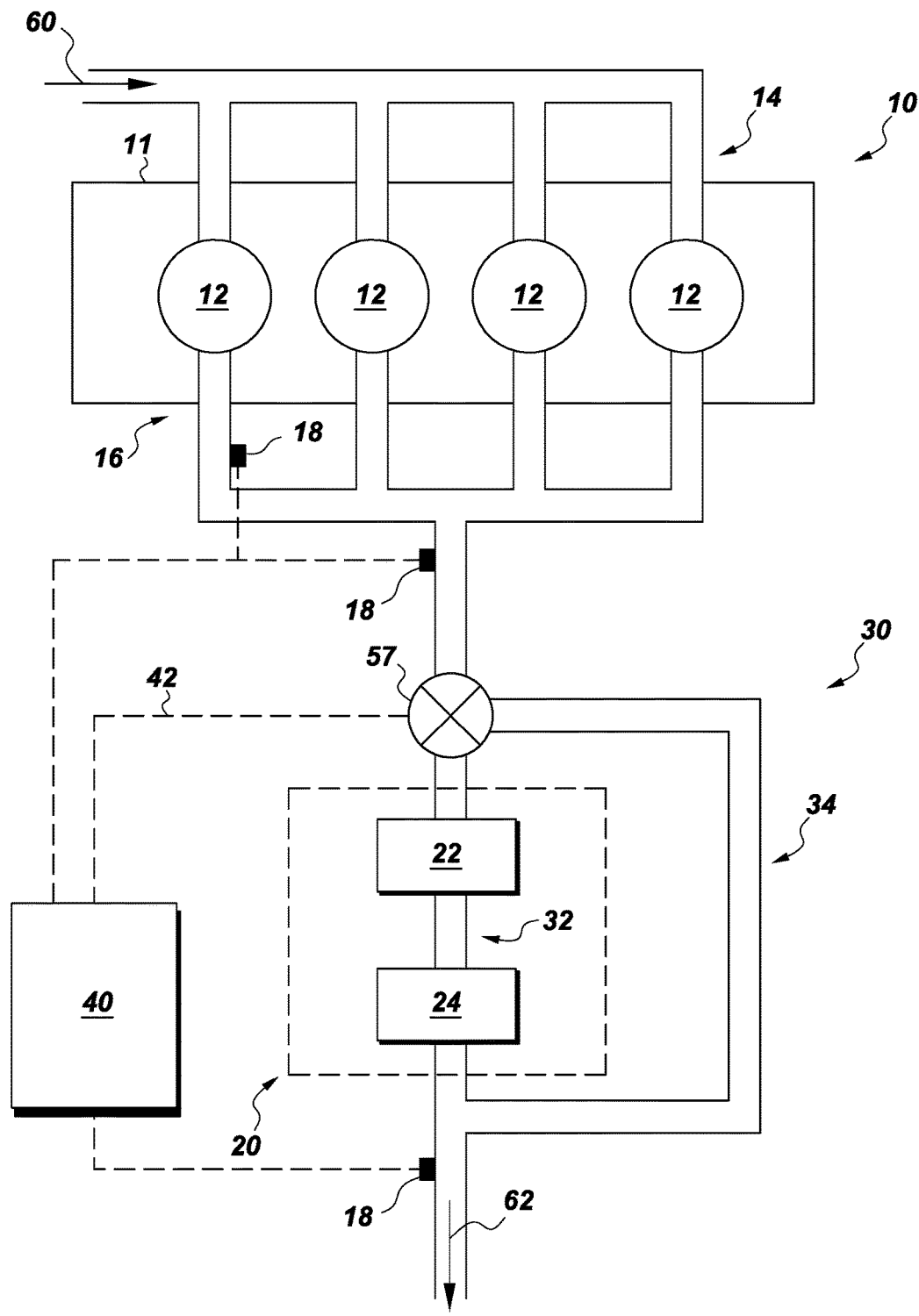
FIG. 1 is a schematic diagram of an internal combustion engine with an aftertreatment bypass, according to an embodiment of the present invention.

Referring to FIG. 1, a schematic view of a portion of an exemplary multi-cylinder internal combustion engine 10 that can incorporate aspects of the present invention is shown. Salient aspects of the engine 10 are shown. The multi-cylinder internal combustion engine, or engine, 10 that has a block 11 which has a plurality of cylinders 12 therein.

As shown, the engine 10 having multiple cylinders 12 also comprises an intake plenum 14 providing intake air 60 to the cylinders 12. The engine 10 also includes an exhaust plenum 16 that leads to an exhaust subsystem 50 leading ultimately to exhaust gasses 62 exiting the engine 10.

Other standard aspects of the engine 10 are not shown for clarity purposes including, but not limited to, fuel systems, turbocharging, controls, and the like. Although the fuel systems are not depicted note that engines that operate on single (e.g., diesel, gasoline, etc.) fuels or dual fuels (e.g., diesel and natural gas, etc.) can benefit from aspects of the invention.

The exhaust system 30 of the engine 10 comprises the exhaust plenum 16 in fluid communication with an exhaust subsystem 30. The exhaust subsystem 30 comprises a first (or primary) exhaust path 32 in parallel with a second exhaust path 34. At least the first exhaust path 32 includes a first aftertreatment system 20.

The engine 10 and/or exhaust subsystem 30 includes a controller 40 that is configured to divert a portion (all or some) of the exhaust flow of the engine from the first exhaust path 32 to the second exhaust path 34. The controller intern 40 may be further configured to divert a portion of the exhaust flow from the first exhaust path to the second exhaust path upon detection of at least one of: an ambient temperature below a predetermined temperature and the engine 10 is operating at idle.

One or more exhaust temperatures sensors 18 may be situated in the exhaust path in one or more locations of the exhaust plenum 16 and/or the exhaust subsystem 30. As shown for example, an exhaust temperature sensor 18 may be located in one or more exhaust manifolds (e.g., close to the engine block 11 and cylinder(s) 12). Similarly, an exhaust temperature sensor 18 may be located further downstream in the exhaust system as indicated. In various configurations, the exhaust temperatures sensors 18 are in communication with the controller 40 so as to obtain and provide exhaust temperature(s).

As shown in FIG. 1, a valve 57 is located separating the first exhaust path 32 from the second exhaust path 34. The valve is in communication with the controller 40 via 42.

The first aftertreatment system 20 may comprise at least one of a Selective Catalytic Reductant (SCR) system 22, a Diesel Oxidation Catalyst (DOC) (not shown), and a Diesel Particulate Filter (DPF) 24. Similarly, the second exhaust path may be entirely devoid of any aftertreatment systems.

Figure 2:
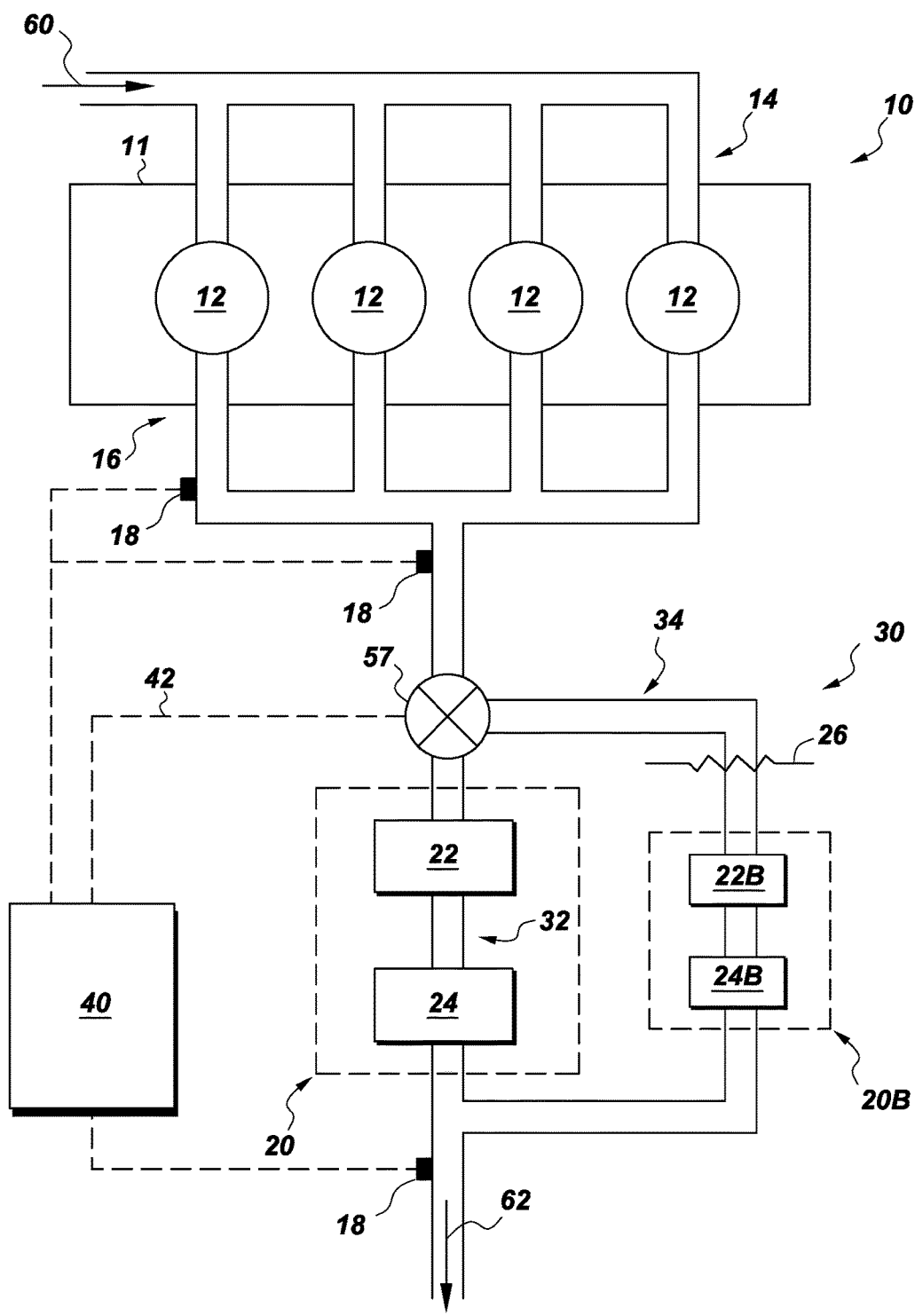
FIG. 2 is a schematic diagram of a portion of an exhaust system of an internal combustion engine with an aftertreatment bypass, according to another embodiment of the present invention.

Referring now to FIG. 2, a schematic view of another embodiment of an engine using the exhaust subsystem is depicted. Several features of the embodiment shown in FIG. 2 are similar to those in FIG. 1. However, the embodiment in FIG. 2 includes a second aftertreatment system 20B on the second exhaust path ("bypass") 34 of the exhaust subsystem 30. The second aftertreatment system 20B may comprise at least one of a SCR 22B, a DOC (not shown), and a DPF 24B. As schematically depicted, the second aftertreatment system 20B may be smaller than the first aftertreatment system 20 in that its use, in general, would be less frequent than the use of the first aftertreatment system 20. In an embodiment, the second aftertreatment system 20B may be removable or sacrificial. The second aftertreatment system 20B may further include a heater 26. The heater 26 may be any suitable heating means including an electric heater, a burner, and the like.

Figure 3:
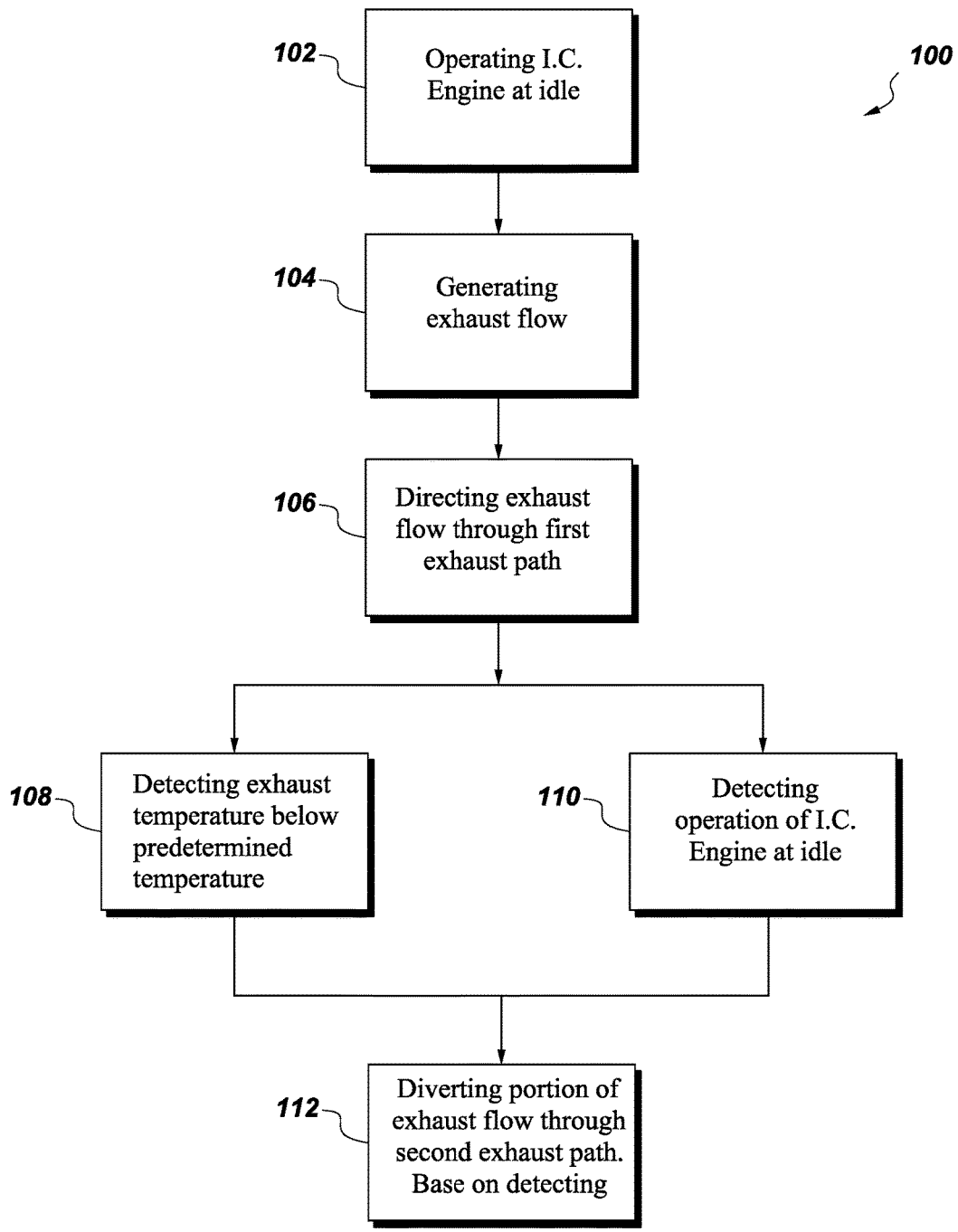
FIG. 3 is a flowchart depicting a method of operating of an internal combustion engine, according to an embodiment of the present invention.

Referring now to FIG. 3, a flowchart depicting a method of operating of an internal combustion engine, according to an embodiment of the present invention, is depicted. The internal combustion engine (see e.g., FIGS. 1, 2) may include a first and second exhaust path, wherein at least the first exhaust path includes a first aftertreatment system. The method 100 includes operating an internal combustion engine at idle at 102. The idle operation (102) thereby generates an exhaust flow at 104. The exhaust flow is directed through a first exhaust path of the exhaust system at 106. The method, at 108 and 110, is detecting if the exhaust temperature is below a predetermined temperature and/or is detecting the operation of the internal combustion engine at idle. Based upon the detecting (108, 110), the method continues with diverting a portion of the exhaust flow through the second exhaust path at 112.

At step 112, the exhaust flow diverted into the second exhaust path from the first exhaust path could be the entire exhaust flow generated by the internal combustion engine (i.e., the entire portion) or a portion less than the entire portion.

The first aftertreatment system can comprise one, or more, of an SCR system, a DOC, and a DPF system. Similarly, as shown for example in FIG. 2, the second exhaust path could comprise a second aftertreatment system that may be smaller than the first aftertreatment system. Alternatively, as shown for example in FIG. 1, the second exhaust path could be entirely devoid of any aftertreatment equipment or system.

After 112, the diverted portion of the exhaust flow through the second exhaust path can optionally be redirected back to the first exhaust path. This redirection (of the exhaust flow) back to the original, first exhaust path can be based upon switching the internal combustion engine to a setting other than idle; reaching a predetermined exhaust temperature; and/or exceeding a time period or duration after an exhaust temperature threshold is reach. For example, a setting of a finite amount of seconds could be set so that after, e.g., 5 seconds, after a predetermined exhaust temperature is reached, the exhaust flow is redirected back to the first exhaust path.

In an embodiment, the threshold for determining when to divert the exhaust flow and use the bypass may be adjusted due to the age of the engine. For example the threshold may be changed if the engine is either new or old. For example, while the piston rings (not shown) are new and not yet broken in in the engine, the controller 40 may be set to run the exhaust flow through the bypass (second exhaust path 34) during the break in period (e.g., first eight hours of engine operation). Similarly, if the engine is aged and near the time for a rebuild (e.g., after predetermined MW-hours of operation), the controller 40 may be set to run the exhaust flow through the bypass (second exhaust path 34) during the last hours (or miles) of operation until the rebuild occurs.

Figure 4:
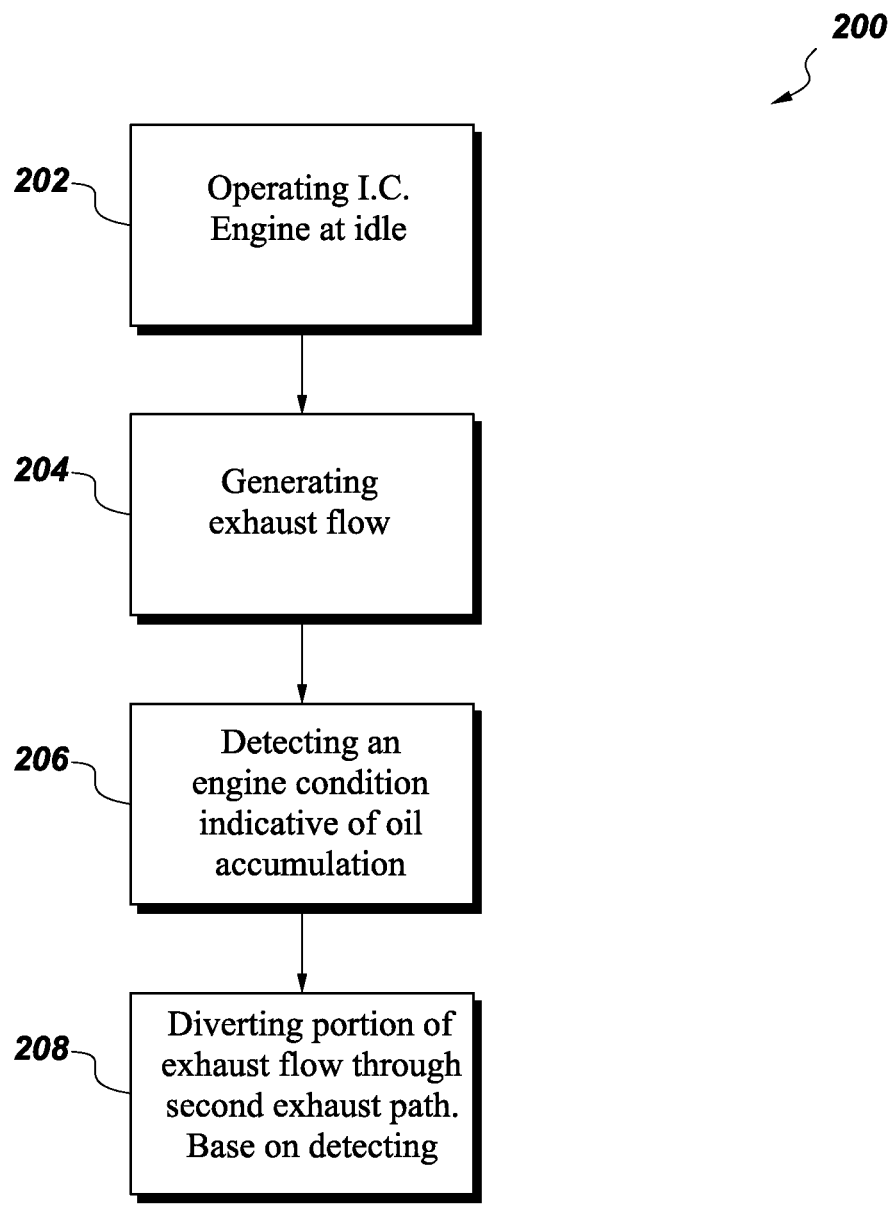
FIG. 4 is a flowchart depicting a method of operating of an internal combustion engine, according to another embodiment of the present invention.

Referring now to FIG. 4, a flowchart depicting a method of operating of an internal combustion engine, according to another embodiment of the present invention, is depicted. The internal combustion engine (see e.g., FIGS. 1, 2) may include a first and second exhaust path, wherein at least the first exhaust path includes a first aftertreatment system. This method 200 includes operating an internal combustion engine at idle at 202. The idle operation (202) thereby generates an exhaust flow at 204. The method 200 then is detecting an engine condition that is indicative of an oil accumulation above a threshold at 206. Based upon the detecting (206), the method 200 continues with diverting a portion of the exhaust flow through the second exhaust path at 208.

There are various engine conditions that are indicative of oil accumulation that is exceeding a threshold. The engine conditions comprise at least one of: the engine is operating at idle, cold ambient temperature, startup (including cold start), engine braking, and motoring. Another engine condition could be an engine hardware failure (e.g., piston ring failure).

After 208, the diverted portion of the exhaust flow through the second exhaust path can optionally be redirected back to the first exhaust path. This redirection back to the original, first exhaust path can be based upon switching the internal combustion engine to a setting other than idle; reaching a predetermined exhaust temperature; and/or exceeding a time period or duration after an exhaust temperature threshold is reach.

While the embodiments illustrated and described herein may be used with a multi-cylinder internal combustion engine 10 as that depicted in FIG. 1, other configurations may be used. For example, other quantities of cylinders and/or configurations of cylinder banks can be used. Similarly, other fuel configurations other than dual fuel (engines running on single fuels including, for example, diesel, gasoline, or natural gas) can be used.

The embodiments discussed herein are suitable for use in an engine 10 that is stationary or vehicular. Suitable uses include, but are not limited to, engines 10 for locomotives, trucks, cars, marine, off-highway vehicles, and the like and in stationary settings including, but not limited to, generators, mechanical applications, petrochemical applications, and the like.

Therefore, according to one embodiment of the present invention, a method of operating an internal combustion engine having a first exhaust path having a first aftertreatment system and a second exhaust path, the method comprises: operating the internal combustion engine at idle, thereby generating an exhaust flow; directing the exhaust flow through the first exhaust path; detecting one of: an exhaust temperature below a predetermined temperature and operation of the internal combustion engine at idle; and diverting a portion of the exhaust flow through the second exhaust path, based on the detecting.

In accordance with another embodiment of the invention, an exhaust subsystem for use with an internal combustion engine comprising: a first exhaust path having a first aftertreatment system; a second exhaust path parallel to the first exhaust path; a value separating the first exhaust path and the second exhaust path; and, a controller, in communication with said valve, configured to divert a portion of an exhaust flow from the first exhaust path to the second exhaust path.

In accordance with another embodiment of the invention, a method of operating an internal combustion engine having a first exhaust path having a first aftertreatment system and a second exhaust path, the method comprises: operating the internal combustion engine, thereby generating an exhaust flow; detecting an engine condition indicative of an oil accumulation above a threshold; and diverting a portion of the exhaust flow through the second exhaust path, based on detecting the engine condition.

The present invention has been described in terms of the preferred embodiment, and it is recognized that equivalents, alternatives, and modifications, aside from those expressly stated, are possible and within the scope of the appending claims.

What is claimed is:

1. An exhaust subsystem for use with an internal combustion engine comprising:
    a first exhaust path having a first aftertreatment system;
    a second exhaust path parallel to the first exhaust path;
    a valve separating the first exhaust path from the second exhaust path; and
    a controller, in communication with the valve, configured to divert a portion of an exhaust flow from the first exhaust path to the second exhaust path responsive to a condition of piston rings of the engine.

2. The exhaust subsystem of claim 1, the second exhaust path having a second aftertreatment system.

3. The exhaust subsystem of claim 1, wherein the first aftertreatment system comprises at least one of: an SCR, a DOC, and a DPF.

4. The exhaust subsystem of claim 1, wherein the portion of the exhaust flow diverted from the first exhaust path is the entire exhaust flow generated by the engine.

5. The exhaust subsystem of claim 1, wherein the engine is configured to operate on one of: diesel and dual fuel.

6. An internal combustion engine comprising the exhaust subsystem of claim 1 in fluid communication with a plurality of cylinders.

7. An exhaust subsystem for use with an internal combustion engine comprising:
    a first exhaust path having a first aftertreatment system, the first aftertreatment system including at least a particulate filter;
    a second exhaust path parallel to the first exhaust path, the second exhaust path including an inlet coupled at a first junction to an upstream portion of the first exhaust path and an outlet coupled at a second junction to a downstream portion of the first exhaust path;
    a valve positioned to control exhaust flow through the second exhaust path; and
    a controller, in communication with the valve, configured to divert a portion of an exhaust flow from the first exhaust path to the second exhaust path responsive to an age of piston rings of the engine, where no other aftertreatment systems are positioned in the first exhaust path upstream of the first junction or downstream of the second junction.

8. The exhaust subsystem of claim 7, wherein the first aftertreatment system further comprises an SCR and/or a DOC.

9. The exhaust subsystem of claim 7, wherein the portion of the exhaust flow diverted from the first exhaust path is an entire exhaust flow generated by the engine.

* * * * *